Nov. 17, 1936.                W. RAE ET AL                 2,060,951
KEY OPERATED ELECTRIC SWITCH, PARTICULARLY FOR USE ON MOTOR VEHICLES
                    Filed June 12, 1935           4 Sheets-Sheet 1
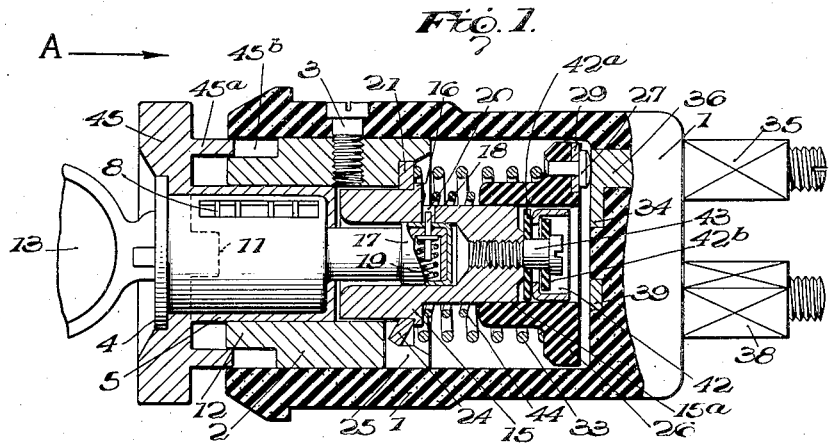
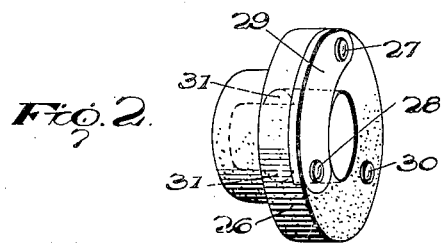
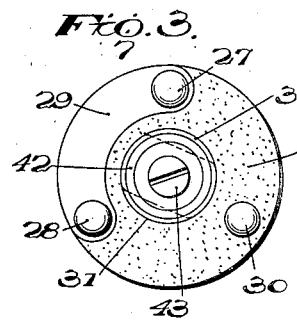
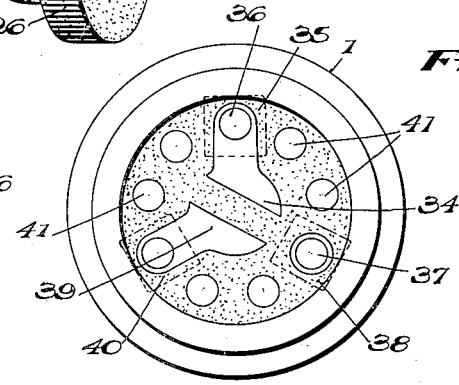
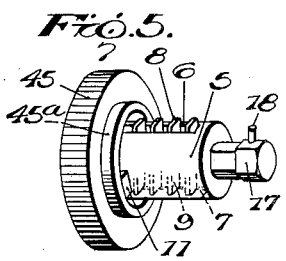
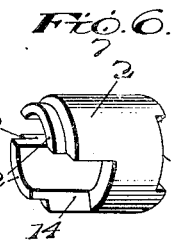
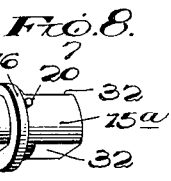
Inventors
William Rae
Thomas Arthur Tisdell
By Steward & McKay
their Attorneys

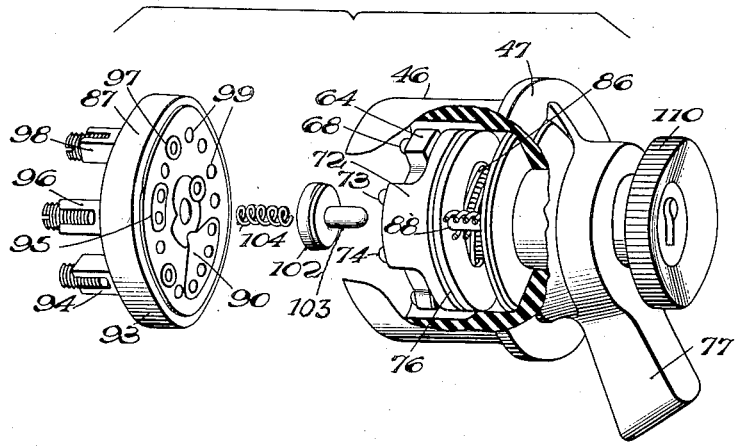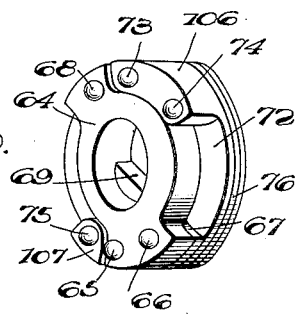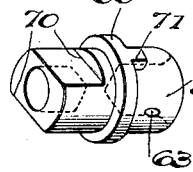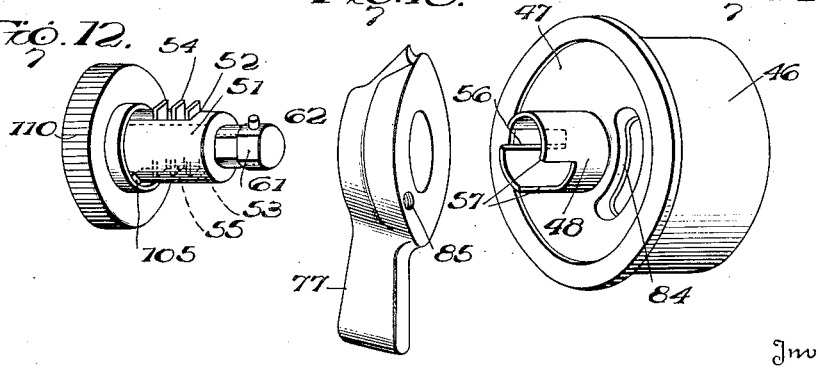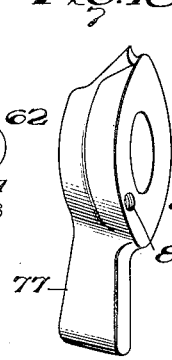

Nov. 17, 1936.  W. RAE ET AL  2,060,951
KEY OPERATED ELECTRIC SWITCH, PARTICULARLY FOR USE ON MOTOR VEHICLES
Filed June 12, 1935  4 Sheets-Sheet 3
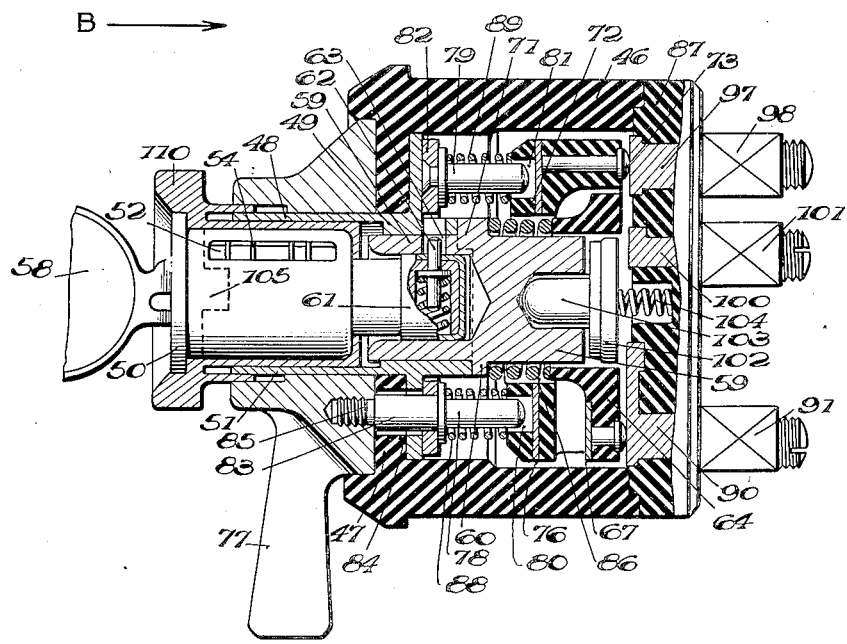
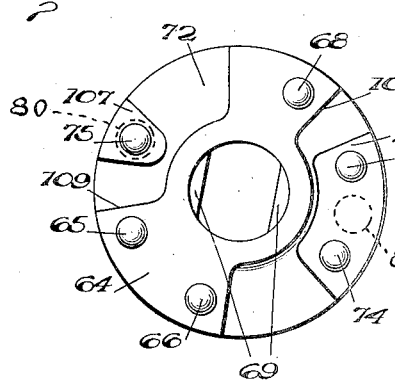
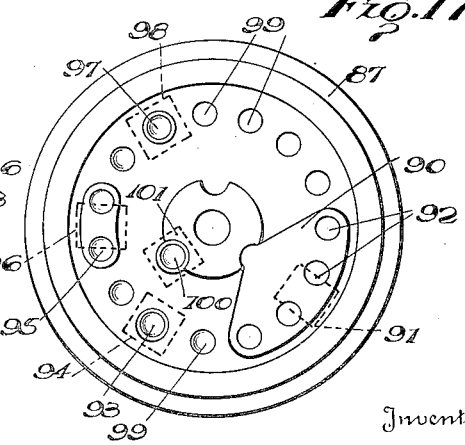
Inventors
William Rae
Thomas Arthur Tisdell
By Steward & McKay
their Attorneys

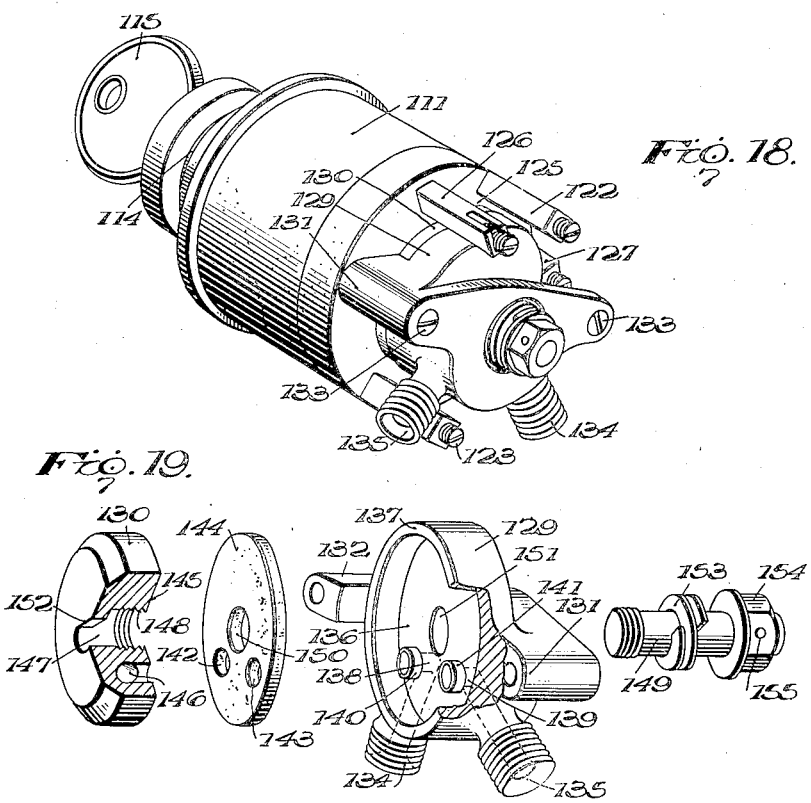

Patented Nov. 17, 1936

2,060,951

UNITED STATES PATENT OFFICE 2,060,951

KEY-OPERATED ELECTRIC SWITCH, PARTICULARLY FOR USE ON MOTOR VEHICLES

William Rae, Dumfries, Scotland, and Thomas Arthur Tisdell, Birmingham, England, assignors to Allen Rae & Company Limited, London, England, a British company, and Amal Limited, Birmingham, England, a British company Application June 12, 1935, Serial No. 26,266
In Great Britain June 19, 1934

31 Claims. (Cl. 200—44)

This invention relates to key operated electric switches, particularly for use on motor vehicles, and in particular to multiple electric switches for controlling the ignition and/or other electrical circuits of a motor vehicle, which switches may, if desired, be combined with valves for controlling the supply of fuel to the engines of such vehicles.

Our invention has for its object to provide multiple switches of the kind referred to in which one or more circuits can be locked and in which the whole assembly is of neat and compact form and can be constructed in a simple and economical manner.

According to our invention we provide a key operated electric switch, for use on motor vehicles and the like, having one or more rotatable control members associated with a co-axial cylinder lock, the cylinder lock or housing being capable of longitudinal and/or rotary movement to operate a switch associated with the starter motor circuit, the said starter switch being automatically returned to its non-contacting position as soon as the operating force is released.

The arrangement is preferably such that a main ignition control is provided, which is adapted to be rotated to complete the ignition circuit by turning the key, after which the latter may be removed from the lock while the switch remains in the "on" position. From this position the switch may be turned either into the locked "off" position or to an intermediate or unlocked "off" position without the aid of the key. From the intermediate "off" position the switch may be returned to the "on" position, also without the aid of the key, but if turned into the locked "off" position the ignition circuit is broken and cannot be made again without inserting the key.

If desired a subordinate control member may be incorporated in the switch mechanism which is adapted to control the lighting circuits of the motor vehicle. The subordinate control member is linked to the main ignition control member by means of an interlocking device comprising projecting segments or the like formed on the members which are adapted to engage with each other in such a manner that the subordinate control member is prevented from operating to its full extent until the main control member has been operated in a given direction, and the return of the latter to its initial position automatically returns the subordinate control member to its initial position, if it has been moved from same, the arrangement being such that the subordinate control member is otherwise independently operable.

Such a device enables the circuit controlling the head lights of the vehicle to be automatically broken when the main control switch is turned into the locked "off" position. Moreover the subordinate control member can only be moved to complete the said circuit by an independent operation when the main control switch is turned into the intermediate "off" position or into the "on" position. The lighting circuit associated with the side or parking lights of the vehicle is preferably not controlled by the movement of the main ignition control member so that the side or parking lights may be switched on or off when the main ignition switch is in either the locked "off", intermediate "off" or "on" position.

Alternatively the subordinate control member may be adapted to control an automatic restarting device of the known type whereby the starter motor is automatically switched on in the event of the engine stalling. In this case the subordinate control member is arranged so that the circuit associated with the automatic restarting device is automatically broken when the main control switch is turned into the intermediate "off" or locked "off" position and the subordinate control member can only be moved to complete its circuit by an independent operation when the main control is switched into the "on" position.

It is also possible to employ two or more subordinate control members, each of which is linked to the main control member in the manner described, to control a plurality of independent circuits.

Our improved switch may, if desired, be combined with a valve for controlling the supply of fuel to the engine of the motor vehicle, the said valve being actuated by the operating spindle of the rotatable control member or members. The valve is preferably located at the rear of the switch casing and spaced slightly apart therefrom so that the possibility of fuel leaking into the switch is obviated. The arrangement is such that when the ignition switch is in the locked "off" position the fuel supply is completely shut off, but when the ignition circuit is completed by turning the key, the valve is opened to allow the full quantity of fuel to flow to the engine.

Several forms of our invention are illustrated in the accompanying drawings, in which:—

Figure 1 is a longitudinal central elevation, partly in section, through a multiple switch constructed in accordance with our invention.

Figure 2 is a perspective view of the rotatable control member of Figure 1.

Figure 3 is a plan view of the rotatable control member shown in Figure 2.

Figure 4 is a plan view of the end contacts viewed from the inside of the switch of Figure 1.

Figure 5 is a perspective view of the cylindrical lock and housing in Figure 1.

Figure 6 is a perspective view of the supporting sleeve of the switch of Figure 1.

Figure 7 is a perspective view of the check washer for limiting the rotational movement of the switch of Figure 1.

Figure 8 is a perspective view of the inner coupling sleeve for the rotatable control member of Figure 1.

Figure 9 is a perspective view of a modified form of multiple switch adapted to control the ignition, starter and lighting or automatic restarting circuits with part of the casing cut away to show the internal mechanism and with some parts of the switch separated from one another to illustrate more clearly their configuration.

Figure 10 is a perspective view of the rotatable control members of Figure 9.

Figure 11 is a perspective view of the inner coupling sleeve for the main control member of Figure 9.

Figure 12 is a perspective view of the cylindrical lock and housing in Figure 9.

Figure 13 is a perspective view of the hand lever for controlling the lighting or automatic restarting switch in Figure 9.

Figure 14 is a perspective view of the front portion of the switch of Figure 9 with the parts shown in Figures 12 and 13 removed.

Figure 15 is a longitudinal central elevation through the switch shown in Figure 9.

Figure 16 is a plan view of the rotatable control members of Figures 9 and 15.

Figure 17 is a plan view of the contact plate viewed from the inside of the switch of Figures 9 and 15.

Figure 18 is a perspective view of a combined multiple switch and valve, adapted to control the electrical circuits of a motor vehicle and also the flow of liquid fuel to the engine.

Figure 19 is a perspective view of the valve portion of the device of Figure 18 with the component parts separated from one another to show more clearly their configuration.

Figure 20 is a longitudinal elevation partly in section of the combined switch and valve shown in Figure 18.

Referring to Figures 1 to 8 of the drawings the reference numeral 1 denotes a cylindrical switch casing which is moulded from a suitable non-conducting plastic material. In the front portion of the casing is inserted a metal supporting sleeve 2 which is secured in position by means of a set screw 3. A cylinder lock 4 housed within a metal casing 5, as shown in detail in Figure 5, is adapted to slide and rotate within the bore of the sleeve 2. Slots 6 and 7 are provided in the casing 5 to accommodate the wards 8 and 9 of the lock, the wards 8 being adapted to engage a narrow slot 10 in the sleeve 2, (Figure 6), to prevent rotation of the lock or housing when the switch is locked in the "off" position.

To prevent longitudinal movement of the lock when in this locked position a projection 11 is provided on the periphery of the lock casing which engages projecting portion 12 formed on the end of the sleeve 2. When the switch is unlocked by turning the key 13 the projection 11 registers with a wide slot 14 in the sleeve 2 and permits the lock and its casing to be moved in a longitudinal direction to operate a press button type of starter switch. The internal arrangement of the lock, not shown in the drawings, is such that the wards 9 project through the slot 7 during removal of the key 13 from the lock, and in order to allow the key to be removed when the lock is in the locked or unlocked position the wards 9 are adapted to register with the wide slot 14 when the lock is in any position.

The casing 5 of the lock has a front portion 45 in the form of a knurled knob, and a projecting ring 45a which registers in the gap 45b between the end of the sleeve 2 and the end of the casing 1 assists in guiding the sliding movement of the lock and its casing.

An inner coupling sleeve 15, as shown in detail in Figure 8, having an integral projecting collar 16, is adapted to rotate and slide within the rear portion of the supporting sleeve 2 and this inner sleeve is arranged to engage a projecting portion 17 of the barrel of the lock. A pin 18 located in the projection 17 of the lock is pressed outwardly by means of a spring 19 to engage a hole 20 in the sleeve to serve as the connecting means between the inner coupling sleeve 15 and the lock 4. In order to limit the rotational movement of the lock and the inner sleeve 15, a check washer 21 is slidably mounted on the outer surface of the sleeve 15 and is adapted to turn with the latter by means of integral keys 22 which engage with corresponding flats 23 on the said sleeve. A projecting prong 24 formed on the washer 21 registers with a slot 25 which is cut in the rear portion of the supporting sleeve 2 the ends of the said slot acting as stops to limit the rotational movement of the switch.

The ignition control member of the switch consists of a rotatable member 26, having projecting contact bosses 27 and 28 which are bridged by a metal insert 29, and a dummy contact 30 which ensures that the control member is pressed evenly against the end portion of the casing. The member 26 is mounted on the surface 15a of the coupling sleeve 15 and is arranged to rotate with the latter by means of keys formed on the inner surface of the said member which engage with corresponding flat surfaces 32 formed on the surface 15a. The ends 31 of the keyways form shoulders against which the sides of the insulating washer 42a may abut to hold the rotary member 26 in position on the surface 15a until the screw 43 is removed. Thus when dismantling the switch for inspection by removing screw 3 and casing 1 the whole of the movable mechanism remains intact.

The rotatable control member 26 is pressed by means of a coil spring 33 against metal contacts provided in the rear portion of the casing 1, the said contacts being moulded or otherwise secured in position. The fixed contacts are arranged in the manner shown in Figures 1 and 4 and are connected to terminals provided at the rear of the switch. A metal contact segment 34 is connected to a terminal 35 which is common to the ignition and starter circuits. A shallow depression 36 is formed in the surface of the segment in order to locate the movable contacts in the various positions of the switch. A single contact 37 having a shallow recess is positioned as shown and is connected to a terminal 38 which is included in the main ignition circuit. A further metal segment 39 of similar shape to the segment 34 is joined to a terminal 40 which is adapted to be connected to a relay circuit included in the starter motor circuit. Shallow recesses 41 are provided in the insulating material of the end of the casing for the purpose of locating the movable contacts.

The press button starting switch comprises a conducting ring 42 which is carried by, but insulated by means of insulating washers 42a and 42b from a screw 43 which is screwed into the end of the inner sleeve 15. When the lock housing 5 is moved in the direction of arrow "A" the conducting ring 42 engages with the contact segments 34 and 39 to complete the starter motor relay circuit. The conducting ring is made a comparatively loose fit on the screw to enable it to seat itself correctly on the contacts 34 and 39. A spring 44, interposed between the collar 16 on the inner sleeve 15 and the end of the rotary control member 26, serves normally to hold the conducting ring clear of the contacts 34 and 39. By arranging the stop 11 in the manner previously described, the starting circuit cannot be completed when the ignition switch is in the locked "off" position but when the key is turned into the intermediate "off" position the engine can be turned over by the starter motor.

The arrangement of the rotary control member is such that when the switch is turned into the locked "off" or the intermediate "off" position the bridged contacts 27 and 28 on the rotary control member register with two of the depressions 41 formed in the insulating material of the switch casing, but when the key 13 or the knurled knob 45 of the lock housing 5 is turned into the "on" position the movable contacts 27 and 28 engage the fixed contacts 36 and 37 respectively to complete the ignition circuit through the connecting insert 29 on the control member 26.

In a modified form of multiple switch shown in Figures 9 to 17 a subordinate control member is incorporated in the switch mechanism for controlling the vehicle lights. Alternatively the subordinate control member may be adapted for controlling an automatic re-starting device. In the drawings, which specifically relate to an auxiliary mechanism for controlling the vehicle lights, the reference numeral 46 denotes a cylindrical switch casing of moulded insulating material which may be conveniently mounted on the dash board of a motor vehicle. Securely attached to the front portion 47 of the casing is a centrally disposed metal supporting sleeve having a front projecting part 48 and a flanged rear portion 49 of reduced internal diameter which projects into the casing as shown. A cylinder lock 50 housed within a metal casing 51 is adapted to slide and rotate within the front projecting part 48 of the sleeve and is of a similar type to the one previously described.

Slots 52 and 53 are provided in the casing 51 to accommodate the wards 54 and 55 of the lock 50, the said wards being adapted to engage slots 56 and 57 in the sleeve 48. The wide slot 57 serves to allow the key 58 to be moved from the lock when the switch is in any position, and also permits the lock and its casing to be moved in a longitudinal direction to operate the press button starter switch when the main ignition switch is in the intermediate "off" or the "on" position in the manner previously described.

An inner coupling sleeve 59 as shown in detail in Figure 11 having an integral projecting collar 60, is adapted to rotate and slide within the reduced part of the flanged rear portion 49 of the supporting sleeve and this inner sleeve is arranged to engage a projecting portion 61 of the barrel of the lock. As in the case of the lock 5 previously described a pin 62 is spring pressed to engage a hole 63 in the sleeve to serve as the connecting means between the inner coupling sleeve 59 and the lock 50.

The main ignition control member of the switch consists of a rotatable member 64 having projecting contact bosses 65 and 66 which are bridged by a metal insert 67, and a dummy contact 68 which ensures that the control member is pressed evenly against the end portion of the casing. The member 64 is mounted on the coupling sleeve 59 and is arranged to rotate with the latter by means of keys 69 formed on the surface of the said member which engages with corresponding flat surfaces 70 formed on the sleeve 59. The rotary movement of the member 64 is limited by means of a projection 71 (Figure 11) which moves in a slot, not shown in the drawings, formed in the rear part 49 of the supporting sleeve.

The portion of the switch controlling the lighting circuits consists of a drum 72 having three contact bosses 73, 74 and 75, mounted on the end thereof, in the manner shown in Figures 10 and 16, the said contacts being connected together by means of a conducting metal ring 76 inserted in the said drum. The drum is mounted on the outside of the rotatable control member 64 and is rotated by means of a hand lever 77 through the medium of pins 78 and 79 which engage holes 80 and 81 in the said drum. The pins are mounted on an annular ring 82 as shown, and the drive is effected by means of a projecting portion 83 of the pin 78 which passes through a slot 84 formed in the front portion 47 of the switch casing 46 and is screwed into the rear face 85 of the hand lever 77.

The main ignition control member 64 is pressed by means of a coil spring 86 against a series of metal contacts provided in a rear cover cap 87 which is detachably secured to the switch casing 46. The rotatable drum 72 is also spring pressed against these contacts by springs 88 and 89 mounted on the pins 78 and 79 respectively.

The fixed contacts in the end cover cap 87 are arranged in the manner shown in Figures 9 and 17 and are connected to terminals provided at the rear of the switch. A metal contact plate 90 is connected to a terminal 91 which is common to the ignition, starting and lighting circuits. Four shallow depressions 92 are formed in the surface of the plate 90 in order to locate the movable contacts in the various positions of the switch. A single contact 93 having a shallow recess is positioned as shown and is connected to a terminal 94 which is included in the main ignition circuit. A double contact 95, connected to a terminal 96 is included in the lighting circuit associated with the side lights of the vehicle, and a single contact 97 and its corresponding terminal 98 forms part of the circuit controlling the head lights. Shallow recesses 99 are provided in the insulating material of the cap 87 for the purpose of locating the movable contacts. A further single contact 100 positioned near to the centre of the cover cap is joined to a terminal 101 which is adapted to be connected to a relay circuit included in the starter motor circuit.

The press button starting switch comprises a conducting ring 102 which is carried by, but insulated from a metal bush 103 which is inserted in the end of the sleeve 59 as shown. When the lock housing 51 is moved in the direction of arrow "B" the conducting ring 102 engages with the contact 100 and a part of the conducting plate 90 to complete the starter motor relay circuit. A spring 104 interposed between the bush 103 and a recess formed in the end cap 87 serves normally to hold the conducting ring clear of the contacts 90 and 100. By arranging a stop 105 on the periphery of the lock casing in the manner previously described, the starting circuit cannot be completed when the ignition switch is in the locked "off" position, but when the key is turned into the intermediate "off" position the engine can be turned over by the starter motor.

The interlocking mechanism between the main ignition control member 64 and the subordinate control member 72 for the lighting circuits, consists of projecting segments 106 and 107 formed on the end of the drum 72 which are adapted to engage with sides 108 and 109 respectively of the control member 64. (Figure 16.) It will be seen that when the projections 106 and 107 are in contact with the sides of the main control member, the subordinate control member 72 cannot be moved to its full extent in one direction by means of the lever 77 without previous movement of the main control member in the same direction. Also when the main control member has moved, the subordinate control member is free to move in the same direction and back again, while if the main control member is returned to its locked "off" position, the projections 106 and 107 will engage with the sides of the control member 64 if the subordinate control member has been moved into its extreme end position and will automatically return same to an intermediate position.

The operation of the switch is as follows:—

When the main ignition switch is in the locked "off" position both the contacts 65 and 66 are located on the contact plate 90 and the ignition circuit is not, therefore, completed. In this position of the main ignition control member, the drum 72 which controls both the side and head lights of the vehicle can be moved from the "off" position in which the contacts 74 and 75 are both opposite the insulated portions of the cover 87 in which position both sets of lights are switched off, to a position in which the contact 75 engages with the contact plate 90 and the contact 74 engages with the fixed contact 95 which is included in the lighting circuit of the side lights. In this position of the switch the circuit is completed through the conducting segment 76 in the member 72 and the side lights only are switched on. Further movement of the drum 72 is prevented by the projections 106 and 107 coming into contact with the sides of the member 64 and the head lights cannot, therefore, be switched on with the ignition control member in the locked position.

When, however, the control member 64 is turned through one notch into the intermediate "off" position by means of the key 58 the ignition circuit still remains broken since the contact 66 registers with the insulated portion between the fixed contacts 90 and 93. This movement of the main control member 64 allows the drum 72 to be turned through a further notch to enable the contact 73 to engage with the fixed contact 97. In this position both the head and side lights are switched on since the contact 74 remains in engagement with the double contact 95.

To complete the ignition circuit either the key 58 or a knurled knob 110 forming part of the lock housing 51 is turned to rotate the control member into the position where the contact 66 registers with the fixed contact 93. This movement does not in any way affect the operation of the lighting switch. It will be seen that if the ignition control member is moved into the locked "off" position when the head lights are switched on, the drum 72 will be moved in a backward direction through one notch by the control member 64, to break the circuit associated with the head lights. By this means the possibility of inadvertently leaving on the head lights when the motor car is parked with the ignition switch locked off is avoided.

In adapting a multiple switch of the kind described with reference to Figures 9 to 17, to control an automatic restarting device in conjunction with the main ignition circuit but not with the lights of the vehicle, the contacts included in the circuits associated with the side lights of the vehicle are omitted, and the circuit for automatically restarting the engine is completed through the terminal 97 and the common terminal 90. By suitably positioning the stops for limiting the movement of the subordinate control member 72 the automatic starting device is so arranged that it cannot be operated until the main ignition switch is put into circuit and when the latter switch is in this "on" position the automatic starting device can be switched in or out of circuit at will by turning the hand lever 77. It will be seen, however, that if the automatic starting device is in circuit when it is desired to switch the main control switch into the intermediate "off" or locked "off" position this former circuit is automatically broken and cannot be completed without turning the hand lever 77 after the main ignition control has been again switched on.

If desired the switch described with reference to Figures 9 to 17 may be modified by substituting for the starter switch 102, 103 a starter switch of the kind described with reference to Figure 1, whereby the end cover cap 87 may be removed for inspection without disturbing the switch mechanism.

It will be observed that switches constructed in accordance with our invention can be assembled prior to the insertion of the lock and that the lock together with the housing can subsequently be fitted by merely inserting the housing in the slotted supporting sleeve until the spring pressed projecting pin in the extended portion of the lock engages the hole in the inner coupling sleeve to hold the lock in position. The lock may thus be conveniently of the same type as, and interchangeable with the door locks which are fitted to the vehicle.

In multiple switches of the kind described, it may be desired to cut off automatically the supply of liquid fuel to the engine of the vehicle when the ignition switch is in the locked position and to this end we provide a fuel valve which is mounted at the rear end of the switch and which is operated by the control spindle of the switch. Referring to Figures 18 to 20 of the drawings the reference numeral 111 denotes a cylindrical switch casing which is moulded from a suitable non-conducting plastic material and which may be conveniently mounted on the dash board of a motor vehicle.

The front portion 112 of the casing is provided with an extension 113 which is adapted to accommodate a cylindrical lock housing 114, the lock housed therein being operated by means of a key 115. Rotary control members, not shown on the drawings, associated with the ignition and other circuits are arranged in the manner previously described, the main ignition control member being operated by turning the key or the lock housing and the subordinate control member by a knurled knob 116 mounted on the extension 113.

Longitudinal movement of the lock housing is adapted to operate a press button type of switch associated with the starter motor circuit. This switch consists essentially of a disc 117 of insulating material which is mounted on a spindle 118 and has secured to it a conducting ring 119 which is adapted to contact with fixed contacts 120 and 121 the latter being connected to terminals 122 and 123 which are in turn connected to a relay circuit included in the starter motor circuit. A light spring 124 interposed between the disc 117 and the end cover cap 125 of the switch casing 111 serves normally to hold the conducting ring clear of the contacts 120 and 121.

Terminals 126 and 127 extend from the end portion 125 of the switch casing as shown in Figure 18. The terminal 126 is connected to the main ignition circuit, and the terminal 127 is connected to the circuit associated with an automatic starting device. Alternatively the arrangement may be such that this latter terminal is associated with a subordinate control member for controlling one or more lighting circuits of the vehicle. The spindle 118 which is rotated by means of the key 115 or the lock housing 114 is arranged to project through a hole in the end cover cap 125 and is provided with a flat portion 128 as shown in Figure 20.

The valve portion of the device is located at the rear of the switch casing and comprises essentially a stationary valve body 129, and a co-operating rotary member 130. The body of the valve, which is preferably made of die cast metal, is provided with lugs 131 and 132 which are adapted to abut against the flat face of the cover cap 125 and the whole assembly is secured in position by means of screws 133. The branch connections 134 and 135 are formed integral with the valve body 129, as shown, and these are screwed externally to take the usual type of union connections. The inside portion of the valve body is formed with a flat face 136 having a circular flange or rim 137 and ports 138 and 139 serve to connect the branches 134 and 135 respectively with the inside face of the valve body. Two short projecting tubes 140 and 141 are inserted in the ports as shown and these are adapted to register with holes 142 and 143 provided in a cork disc 144 which forms a seating for the rotary valve member 130.

The rotary member 130 comprises a metal disc having a flat face 145 which is held in contact with the cork disc 144. Two holes are drilled in the face 145 and these are interconnected by means of a passage 146 the said holes being located so that in one position of the rotary member they are adapted to register with the ports 138 and 139 which communicate with the branch connections 134 and 135. The rotary member is provided with a centrally disposed hole 147, one end 148 of which is screwed to take a spindle 149 which projects through a central hole 150 in the cork disc 144 and is journaled in a supporting bearing 151 formed in the valve body 129. The unscrewed portion of the hole 147 in the rotary member is provided with a flat portion 152 which forms a key which is adapted to register with the flat portion 128 on the spindle 118.

Free sliding movement of the spindle 118 is permitted to a limited extent and sufficient space is provided between the end of the spindle 116 and the spindle 149 to allow the lock housing to be moved in the direction of arrow "C" to operate the press-button starter switch. To enable a satisfactory petrol tight joint to be formed between the stationary cork disc 144 and the rotatable member 130 the latter is spring pressed on to its seating by means of a spring washer 153 and a co-operating nut 154 which is locked in the required position by means of a pin 155. It will be observed that the small tubes 140 and 141 do not actually come into contact with the face 145 of the rotatable member but serve to locate the cork disc and to reinforce the material adjacent to the holes 142 and 143. Since the rotary member is slightly spaced apart from the end cap 125 of the switch casing the possibility of petrol leaking into the switch casing is obviated.

The operation of the device is as follows:— When the ignition switch is turned into the "on" position the holes in the face 145 of the rotary member register with holes 142 and 143 in the cork disk 144 and with the ports 138 and 139 in the valve body. In this position the valve is open, and petrol is allowed to flow from one of the branch connections to the other via the ports 138 and 139, the short tubes 140 and 141 and the passage 146 in the rotary member. When the switch is locked in the "off" position the rotary member is turned by the spindle 118 so that the solid portion of the flat face 145 covers the holes 142 and 143 in the cork disc 144 and the flow of petrol is completely cut off.

We claim:—

1. A key operated electric switch for use on motor vehicles and the like, comprising a cylinder lock, at least one rotatable control member mounted co-axially with said lock, and a slidable starter switch associated with the starter motor circuit of the vehicle, said lock being adapted to lock the movement of both said rotatable control member and said starter switch, and said starter switch being adapted to be automatically returned to its non-contacting position as soon as the operating force is released.

2. A switch as set forth in claim 1, in which the rotatable control member is a rotary switch member controlling at least one lighting circuit of the vehicle.

3. A switch as set forth in claim 1, in which the rotatable control member is a rotary valve member controlling the supply of fuel to the engine of the vehicle.

4. A key operated electric switch for use on motor vehicles and the like, comprising a cylinder lock, a rotary switch member associated with the main ignition circuit of the vehicle and mounted co-axially with said lock, and a slidable starter switch associated with the starter motor circuit of the vehicle, said lock being adapted to lock the movement of both said rotary switch member and said starter switch, said rotary switch being adapted to be rotated to complete the ignition circuit by turning the key of said lock, and said starter switch being adapted to be automatically returned to its non-contacting position as soon as the operating force is released.

5. A switch as set forth in claim 4, in which the cylinder lock is adapted to rotate and slide within a fixed supporting sleeve, said sleeve having a longitudinal slot to accommodate the wards of the lock to prevent rotation of the latter when the switch is in the locked position and a further longitudinal slot to accommodate wards located on the opposite side of the lock to allow the key to be removed when the lock is in the unlocked position.

6. A switch as set forth in claim 4, in which an intermediate unlocked "off" position is provided for the rotary switch member, and an external hand knob is associated with the cylinder lock so that the switch may be turned from the "on" position to the intermediate "off" position and vice versa, and also from the intermediate "off" position to the locked "off" position, without the aid of the key.

7. A key operated electric switch for use on motor vehicles and the like, comprising a cylinder lock having a reduced co-axial extension at the end thereof remote from the key, a sleeve surrounding said reduced extension, at least one rotatable control member mounted on the outside of said sleeve and slidable relative thereto, and a slidable starter switch of the push-button type associated with the starter motor circuit of the vehicle and operable by said sleeve, said lock being adapted to lock the movement of both said rotatable control member and said starter switch, and said starter switch being adapted to be automatically returned to its non-contacting position as soon as the operating force is released.

8. A switch as set forth in claim 7, in which said starter switch comprises a conducting ring carried by and insulated from a screw normally located in the remote end of the sleeve surrounding the reduced extension of the lock, the arrangement being such that on removal of the end cover of the switch the movable portions of the mechanism of the switch remain intact, being held in position by said screw.

9. A key operated electric switch for use in motor vehicles and the like, comprising a cylinder lock, a main rotatable control member mounted co-axially with said lock and at least one subordinate control member associated with said main control member and linked thereto by means of an interlocking device comprising projections formed on the said members which are adapted to engage with one another in such a manner that the subordinate control member is prevented from operating to its full extent until the main control member has been operated in a given direction, the arrangement being such that the return of the main control member to its initial position automatically returns the subordinate control member to its initial position if it has been moved from the same, the subordinate control member being otherwise independently operable.

10. A switch as set forth in claim 9, in which the subordinate control member is adapted to control the lighting circuits of the vehicle in such a manner that the circuit associated with the headlights is automatically broken when the switch is in the locked "off" position, and the subordinate control member can only be moved to complete the headlight circuit by an independent operation after the main control member has been turned from the locked position.

11. A switch as set forth in claim 9, in which the subordinate control member is adapted to automatically switch on the starter motor in the event of the engine stalling, the arrangement being such that the circuit associated with the automatic re-starting device is automatically broken when the main control member is turned from the "on" position and the subordinate control member can only be moved to complete its circuit by an independent operation when the main control member is switched into the "on" position.

12. A key operated electric switch for use on motor vehicles and the like, comprising a cylinder lock, a rotary switch member associated with the main ignition circuit of the vehicle and mounted co-axially with said lock, and a rotary valve controlling the supply of fuel to the engine, the arrangement being such that when the ignition switch is in the locked "off" position the fuel supply is completely cut off, but when the ignition circuit is completed by turning the key the valve is opened to allow the full quantity of fuel to flow to the engine.

13. A switch as set forth in claim 12, in which the valve comprises a fixed valve body and a co-operating rotary member connected to the operating spindle of the rotary switch member, the said co-operating rotary member having a flat face which is spring-pressed into contact with a flat seating in the valve body, two interconnected ports being formed in the said rotary member which are adapted to register with corresponding ports in the flat seating, which are in communication with fuel inlet and outlet ports formed in the valve body.

14. A switch as set forth in claim 12, in which the valve seating comprises a disc of resilient material having two holes formed therein which register with inlet and outlet ports in the valve body, the said disc being located in position and reinforced local to the holes by means of short tubes which are inserted in the said holes and which project slightly into the ports in the valve body.

15. A switch as set forth in claim 12, in which the valve is mounted at the rear of the switch casing, the rotatable portion of the said valve being spaced slightly apart from the end portion of the switch casing to avoid the possibility of fuel leaking into the switch casing.

16. A switch as set out in claim 1, in which the rotatable control member is a rotary switch member controlling at least one electrical circuit.

17. A key operated electric switch, comprising a cylinder lock, a rotatable switch member mounted coaxially with said lock, a slidable switch member mounted coaxially with said lock, slidable and rotatable means mounted coaxially with said lock for operating said rotatable and slidable switch members, said lock being adapted to lock said operating means against both sliding and rotating movement, and means for automatically returning the slidable switch member to non-contacting position after operation by said operating means.

18. A switch as set forth in claim 17 in which the rotatable switch member is rotatable with and slidably mounted on said operating means.

19. A switch as set forth in claim 17 in which the rotatable switch member is rotatable with and slidably mounted on said operating means, and resilient means are provided for urging the rotatable switch member against an abutment carrying stationary contacts.

20. A switch as set forth in claim 17 including a casing in which said lock, switch member and operating means are mounted, said casing being closed at one end and open at the other, stationary switch contacts associated with said switch members and mounted in said closed end, and a sleeve removably secured in said casing adjacent said open end, said sleeve supporting said operating means.

21. A switch as set forth in claim 17 including a casing in which said lock, switch members and operating means are associated and mounted as a unit assembly, and means for supporting said assembly and securing it within said casing.

22. A switch as set forth in claim 17 including a casing in which said lock, switch members and operating means are mounted, said casing being closed at one end and open at the other, and a sleeve removably secured in said casing adjacent said open end for supporting and securing said lock, switch members and operating means in said casing, said operating means comprising two members removably connected together and having projections at opposite ends which are adapted to engage the ends of said sleeve whereby said operating means is retained in said sleeve.

23. A key operated electric switch for use on motor vehicles and the like, comprising a cylinder lock, a co-axial extension member coupled thereto, at least one rotatable control member mounted on said extension member, and a self-returning starter switch associated with the starter motor circuit of the vehicle, the movable portion of said starter switch being carried by said extension member and the arrangement being such that said lock is adapted to lock the movement of both said rotatable control member and said starter switch.

24. A switch as set forth in claim 23, in which the rotatable control member is a rotary switch member controlling at least one lighting circuit of the vehicle.

25. A switch as set forth in claim 23, in which the rotatable control member is a rotary valve member controlling the supply of fuel to the engine of the vehicle.

26. A switch as set out in claim 23, in which the rotatable control member is a rotary switch member controlling at least one electrical circuit.

27. A key operated electric switch for use on motor vehicles and the like, comprising a cylinder lock, a co-axial extension member coupled thereto, a rotary switch member associated with the main ignition circuit of the vehicle and mounted on said extension member, and a self-returning starter switch associated with the starter motor circuit of the vehicle, the movable portion of said starter switch being carried by said extension member and the arrangement being such that said lock is adapted to lock the movement of both said switch member and said starter switch, while said rotary switch is adapted to be rotated to complete the ignition circuit by turning the key of said lock.

28. A switch as set forth in claim 27, in which the cylinder lock is adapted to rotate and slide within a fixed supporting sleeve, said sleeve having a longitudinal slot to accommodate the wards of the lock to prevent rotation of the latter when the switch is in the locked position and a further longitudinal slot to accommodate wards located on the opposite side of the lock to allow the key to be removed when the lock is in the unlocked position.

29. A switch as set forth in claim 27, in which an intermediate unlocked "off" position is provided for the rotary switch member, and an external hand knob is associated with the cylinder lock so that the switch may be turned from the "on" position to the intermediate "off" position and vice versa, and also from the intermediate "off" position to the locked "off" position, without the aid of the key.

30. A key operated electric switch for use on motor vehicles and the like, comprising a cylinder lock, a co-axial extension member coupled thereto, at least one rotatable control member slidably mounted on said extension member, and a self-returning press-button starter switch associated with the starter motor circuit of the vehicle, the movable portion of said starter switch being carried by said extension member and the arrangement being such that said lock is adapted to lock the movement of both said rotatable control member and said starter switch.

31. A switch as set forth in claim 30, in which said starter switch comprises a conducting ring carried by and insulated from a screw normally located in the end of said co-axial extension remote from the cylinder lock, the arrangement being such that on removal of the end cover of the switch the movable portions of the mechanism of the switch remain intact, being held in position by said screw.

WILLIAM RAE.
THOMAS ARTHUR TISDELL.